No. 775,384. Patented November 22, 1904.

UNITED STATES PATENT OFFICE.

GEORGE M. PRESSEL AND OTTO FISHER, OF INDIANAPOLIS, INDIANA, ASSIGNORS OF ONE-THIRD TO DANIEL C. KEELY, OF INDIANAPOLIS, INDIANA.

CEMENT AND GLAZE FOR FIRE-BRICK.

SPECIFICATION forming part of Letters Patent No. 775,384, dated November 22, 1904.

Application filed June 27, 1904. Serial No. 214,415. (No specimens.)

*To all whom it may concern:*

Be it known that we, GEORGE M. PRESSEL and OTTO FISHER, citizens of the United States, residing at Indianapolis, in the county of Marion and State of Indiana, have invented certain new and useful Improvements in Cement and Glaze for Fire-Brick, of which the following is a specification.

In laying fire-brick in furnace and other similar settings wherever the brick is to be subjected to high temperatures difficulty is experienced by reason of the lack of fire-resisting qualities in the cements or mortars used in holding the bricks in position, the most common cement being formed of a mixture of fire-clay and water. Ordinary fire-brick also has no glaze and as a consequence offers a good holding-surface for clinkers, so that when the clinkers are broken out pieces of the brick are carried with them.

The object of our invention is to produce a composition which will serve as a setting or cement for bricks and will also produce a glaze over the entire brick surface.

Our invention consists, therefore, in a mixture of carborundum, sodium silicate, New Orleans molasses, (or sugar made therefrom,) common salt, and fire-clay, these materials being mixed with sufficient water to form either a paste or thin batter, as the operator may desire. In practice we have found that the above substances should be combined in about the following proportions to make sufficient cement and glaze to set one thousand brick, to wit: seven pounds of carborundum, one gallon of sodium silicate, one quart of molasses or its sugar equivalent, one peck of salt, three and one-half bushels of fire-clay. This quantity we mix with sufficient water preferably to make a thin batter, into which the bricks are dipped and then laid in position. After the bricks have been laid, especially in arches, the composition is used as a grouting to fill all interstices, and the fire-face of the work is then painted or washed with the composition.

The composition sets very rapidly and as soon as it is subjected to heat produces a very high glaze which is exceedingly fire resisting. If the glaze is not desired, the carborundum and sodium silicate may be omitted, and the carborundum may be omitted where a glaze of less hardness is desired.

We claim as our invention—

1. A cement consisting of fire-clay, common salt, and New Orleans molasses (or its sugar equivalent.)

2. A cement consisting of fire-clay, common salt, New Orleans molasses (or its sugar equivalent), sodium silicate, and carborundum.

3. A cement consisting of fire-clay, common salt, New Orleans molasses (or its sugar equivalent), and sodium silicate.

In witness whereof we have hereunto set our hands and seals, at Indianapolis, Indiana, this 25th day of June, A. D. 1904.

GEORGE M. PRESSEL. [L. S.]
OTTO FISHER. [L. S.]

Witnesses:
D. C. KEELY,
ARTHUR M. HOOD.